(12) United States Patent
Manner

(10) Patent No.: US 8,050,778 B2
(45) Date of Patent: Nov. 1, 2011

(54) SENSOR-MACHINE INTERFACE AND METHOD FOR OPERATION THEREOF

(75) Inventor: Bernd Manner, Bahlingen (DE)

(73) Assignee: Sick AG, Waldkrich (DE)

( * ) Notice: Subject to any disclaimer, the term of this patent is extended or adjusted under 35 U.S.C. 154(b) by 1654 days.

(21) Appl. No.: 10/508,132

(22) PCT Filed: Mar. 13, 2003

(86) PCT No.: PCT/EP03/02645
§ 371 (c)(1),
(2), (4) Date: May 4, 2005

(87) PCT Pub. No.: WO03/079122
PCT Pub. Date: Sep. 25, 2003

(65) Prior Publication Data
US 2005/0203641 A1    Sep. 15, 2005

(30) Foreign Application Priority Data
Mar. 18, 2002 (DE) .................................. 102 11 941

(51) Int. Cl.
*G05B 11/01* (2006.01)
*G06M 7/00* (2006.01)
*G08B 13/18* (2006.01)
(52) U.S. Cl. ........................... 700/17; 250/221; 340/555
(58) Field of Classification Search ................ 700/9, 17, 700/19–21, 169, 180, 11, 83; 702/187–189; 709/220, 223, 224, 330; 340/3.71, 3.1, 555; 250/221
See application file for complete search history.

(56) References Cited

U.S. PATENT DOCUMENTS

| 4,611,296 A | * | 9/1986 | Niedermayr | 700/260 |
| 4,638,433 A | * | 1/1987 | Schindler | 700/90 |
| 4,775,913 A | * | 10/1988 | Ekblad | 361/179 |
| 5,059,871 A | * | 10/1991 | Pearlman et al. | 315/316 |
| 5,218,196 A | * | 6/1993 | Dogul et al. | 250/221 |
| 5,321,490 A | * | 6/1994 | Olson et al. | 356/5.03 |
| 5,408,089 A | * | 4/1995 | Bruno et al. | 250/221 |
| 5,621,205 A | * | 4/1997 | Warner et al. | 250/205 |

(Continued)

FOREIGN PATENT DOCUMENTS

DE    33 40 946 A1    5/1985

(Continued)

OTHER PUBLICATIONS

"Functional safety in the field of industrial automation. The influence of IEC 61508 on the improvement of safety-related control systems"; Von Krosigk, H.; Computing & Control Engineering Journal; (2000); vol. 11, No. 1, pp. 13-18.*

(Continued)

*Primary Examiner* — Ramesh Patel
*Assistant Examiner* — Jennifer Norton
(74) *Attorney, Agent, or Firm* — Harness, Dickey & Pierce, P.L.C.

(57) ABSTRACT

The invention relates to a sensor-machine interface for the coupling of at least one sensor to at least one machine with at least one sensor input for receiving sensor status signals, at least one machine output, for transmission of machine control signals, a programme memory and a controller for programme-controlled operation of the machine output dependent on the signals received by means of the sensor input and a method for operating such an interface.

28 Claims, 1 Drawing Sheet

U.S. PATENT DOCUMENTS

| | | | |
|---|---|---|---|
| 5,783,989 A * | 7/1998 | Issa et al. | 340/426.25 |
| 5,808,296 A * | 9/1998 | McMonagle et al. | 250/221 |
| 6,115,654 A * | 9/2000 | Eid et al. | 701/34 |
| 6,212,585 B1 * | 4/2001 | Chrabaszcz | 710/302 |
| 6,246,318 B1 | 6/2001 | Veil et al. | |
| 6,373,557 B1 * | 4/2002 | Mengel et al. | 356/4.07 |
| 6,580,848 B2 * | 6/2003 | Hartl | 385/16 |
| 6,588,698 B2 * | 7/2003 | Gangemi et al. | 242/534 |
| 6,777,892 B2 * | 8/2004 | Huber et al. | 315/291 |
| 6,778,080 B2 * | 8/2004 | Veil et al. | 340/506 |
| 6,787,940 B2 * | 9/2004 | Pullmann | 307/326 |
| 6,823,223 B2 * | 11/2004 | Gonzales et al. | 700/86 |
| 6,865,428 B2 * | 3/2005 | Gonzales et al. | 700/86 |
| 6,950,778 B2 * | 9/2005 | Warner et al. | 702/182 |
| 7,242,116 B2 * | 7/2007 | Kawazu et al. | 307/326 |
| 2001/0040514 A1 * | 11/2001 | Horber | 340/933 |
| 2003/0218122 A1 * | 11/2003 | Haberer et al. | 250/221 |
| 2004/0135073 A1 * | 7/2004 | Sugiyama et al. | 250/221 |
| 2005/0078297 A1 * | 4/2005 | Doemens et al. | 356/5.04 |
| 2007/0239399 A1 * | 10/2007 | Sheynblat et al. | 702/187 |
| 2008/0162673 A1 * | 7/2008 | Basheer Ahamed et al. | 709/220 |
| 2008/0243440 A1 * | 10/2008 | Matsumoto et al. | 702/188 |
| 2008/0303667 A1 * | 12/2008 | Rehman | 340/572.1 |
| 2008/0307076 A1 * | 12/2008 | Ewing et al. | 709/220 |
| 2009/0086023 A1 * | 4/2009 | McCubbrey | 348/143 |

FOREIGN PATENT DOCUMENTS

| | | |
|---|---|---|
| DE | 19707241 | 2/1997 |
| DE | 19816273 | 7/1999 |
| DE | 19805606 A | 9/1999 |
| DE | 19933812 A | 2/2001 |
| DE | 100 20 074 A1 | 11/2001 |
| EP | 0 605 496 B2 | 5/1998 |
| EP | 0913750 | 5/1999 |
| WO | WO 00/42477 | 7/2000 |

OTHER PUBLICATIONS

International Search Report for PCT/EP03/02645; ISA/EP; Mailed: Apr. 6, 2004.

Mar. 19, 2004 German Search Report for German Patent Application No. 102 11 941.4, with English translation.

* cited by examiner

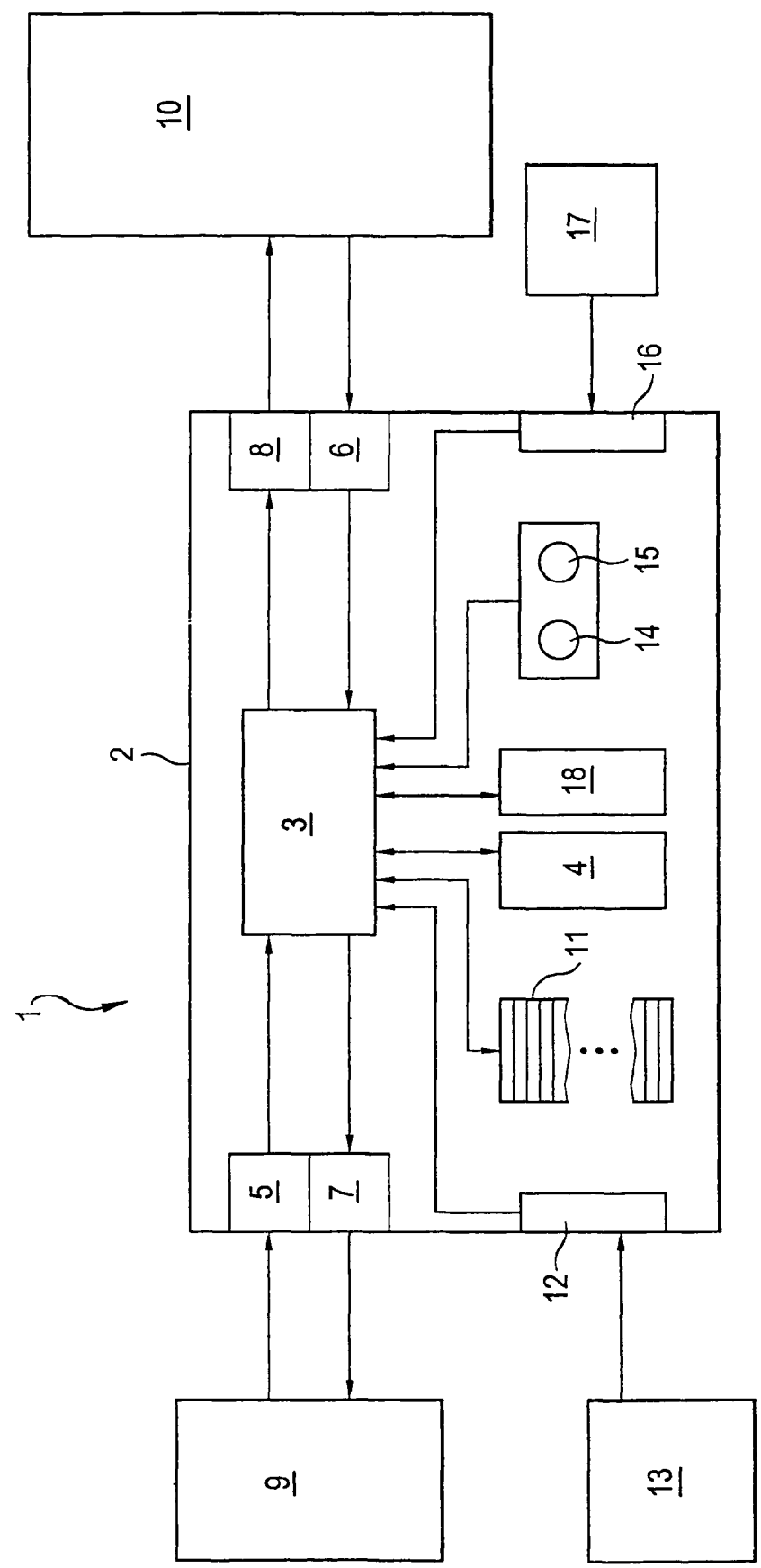

SENSOR-MACHINE INTERFACE AND METHOD FOR OPERATION THEREOF

The invention relates to a sensor/machine interface for the coupling of at least one sensor to at least one machine.

In accordance with the prior art, sensors such as light grids, light barriers or scanners are directly connected to a machine, for example to a press, to a robot, to an engine, etc. or to the control computer associated with the machine.

Such a connection is disadvantageous when safety standards have to be observed with respect to the total sensor/machine arrangement in order to avoid injuries to operators, for example. In this case, the safety-relevant job of evaluating signals coming from the sensor and of transforming them into control signals or switch-off signals for the machine namely falls to the control computer associated with the machine. Accordingly, the whole control computer, which is relatively complex as a rule, must satisfy the respectively required safety standards, although only a few of the jobs it has to do are relevant to safety. Accordingly, even though it largely takes over jobs not relevant to safety, the complete control computer must therefore be designed such that it, and equally the software running on the control computer, satisfies the respectively applicable safety standards, which is associated with a disadvantageously high economic effort. The satisfaction of the safety standards must in particular be inspected for every machine or for every control computer, including the associated software, by a correspondingly responsible licensing office, which additionally increases the effort to be made.

An object underlying the invention consists of designing a sensor/machine coupling of the said kind such that it can be realized at favorable cost and such that it in particular simultaneously satisfies the respectively applicable safety standard.

In accordance with the invention, this object is satisfied by a sensor/machine interface for the coupling of at least one sensor to at least one machine having at least one sensor input for the reception of sensor state signals, at least one machine output for the transmission of machine control signals, a program memory and a control unit for outputting program control signals to the machine output in dependence on the signals received via the sensor input.

In accordance with the invention, the safety-relevant part of the control computer belonging to a machine is therefore taken out of the control computer and transposed into a sensor/machine interface. This is a separate, comparatively small assembly which is interposed between the sensor and the machine or between the sensor and the control computer of the machine. This assembly takes over the job of converting the signals coming from the sensor into control signals or switch-off signals for the machine. This advantageously has the effect that only the sensor/machine interface which is provided in accordance with the invention and which is substantially less complex in comparison with the machine control computer has to satisfy the respectively applicable safety standards, whereas the control computer can thus be designed at a favorable cost in a conventional manner. In addition, the sensor/machine interface in accordance with the invention can be made such that it is suitable for connection to a plurality of different machines and to a plurality of different sensors such that in each case only one and the same sensor/machine interface with the associated software has to be licensed with respect to the satisfaction of the applicable safety standards for a corresponding plurality of different combinations of sensors and machines. This brings about a further cost advantage.

The sensor/machine interface in accordance with the invention, which is preferably accommodated in a housing separate from the sensor and from the machine, can additionally advantageously have at least one machine input for the reception of machine state signals, with it being possible to control the machine output by the signals received via the sensor input and/or via the machine input. It accordingly becomes possible by the said machine input to control a machine not only in dependence on sensor signals, but simultaneously also in dependence on machine states. This is sensible in such applications in which the machine should, for example, not always be switched off when an object intrudes into the monitored zone of the associated sensor. It is, for example, not necessary to switch off an opening press if an operator is located in the monitored zone. In this case, the sensor/machine interface in accordance with the invention does not transmit a switch-off signal when the state "opening" is reported via the machine input, and indeed independently of the signals of the sensor delivered via the sensor input.

If, however, the press is closing, an accordingly the state "closing" is reported via the machine input, and if an object is simultaneously present in the monitored zone, a switch-off signal is transmitted via the machine output in order thus to prevent an operating being injured.

In a generalized form, the interface in accordance with the invention is therefore preferably operated such that, on the reception of specific sensor signals or machine state signals or of specific combinations of sensor signals and machine state signals, no machine switch-off signal is transmitted and, on the reception of other sensor signals or machine state signals via the machine output, a machine switch-off signal is transmitted.

It is furthermore of advantage for the machine output to be designed for the transmission of machine switch-off signals and/or for the transmission of machine actuation signals, in particular machine clock signals. A press, for example, can always be supplied with a clock signal by this measure and can be actuated in this manner when an operator takes his hands out of the monitored zone of the associated sensor.

The hardware and software of the sensor/machine interface in accordance with the invention preferably satisfy customary safety standards, in particular the standards IEC61508 and/or EN61496. To ensure these safety standards, at least the control unit present in the interface can be present in duplicate in a redundant manner.

Different programs or program modules can be stored in the program memory so that the program control of the machine output can be carried out in different manners. The sensor/machine interface in accordance with the invention can be matched to different operating demands, to different sensors and to different machines by this measure. The different programs or program modules can be loaded into the program memory by an external programming device, in particular by a computer or by a laptop, via a programming interface. It is in particular possible to assemble the programs stored in the program memory from pre-determined program modules via an operating interface in particular running on the computer or on the laptop. The assembly of the programs from individual program modules has the advantage that only the individual program modules have to be inspected or licensed with respect to the satisfaction of safety demands, whereby it is then ensured that the programs assembled from these program modules also satisfy the corresponding safety standards. A separate licensing of the finished programs is then no longer necessary so that—by the licensing of a limited number of program modules—a very much higher number of programs assembled from these modules is available without these programs having to be separately licensed.

The selection of the different programs available in the sensor/machine interface in accordance with the invention, and assembled, for example, from program modules, in dependence on the respective application is preferably carried out by means of a program selection switch.

It is particularly advantageous if a sensor output is additionally provided via which a connected sensor can be configured and/or monitored. This sensor output can then be used, for example, to automatically monitor by means of the programs stored in the program memory whether the sensor/machine interface is working correctly and/or whether the sensor matching the selected program is connected to the sensor input and/or output and/or whether the connected sensor is working properly. It can moreover also be automatically monitored by means of the programs stored in the program memory whether the machine matching the selected program is connected to the machine input and/or output.

It is of advantage if a sensor configuration memory is provided in the interface in which configuration data for a sensor connected to the sensor output can be stored. In this case, a connected sensor can be configured via the sensor output. The configuration data can, for example, be loaded into the sensor configuration memory by the sensor when a sensor is connected, with it being necessary in this case to configure the sensor before it is connected to the interface. It is, however, likewise also possible to load the configuration data into the sensor from the sensor configuration memory when the sensor is connected to the interface in accordance with the invention. In this case, it is not necessary to configure the sensor in advance; however, the sensor configuration memory must be correspondingly assigned before the connection of the sensor. This assignment of the sensor configuration memory can be brought about, for example, by means of a configuration device which is suitable for loading configuration data into the sensor configuration memory.

It is preferred for different sets of configuration data to be able to be stored in the sensor configuration memory which relate to different sensor types and/or to different programs. It is thus possible to configure sensors of different types with the interface in accordance with the invention and also to carry out different configurations in dependence on the respective programs running in the interface in accordance with the invention.

It is particularly preferred for configuration data matching the connected sensor type to be automatically loaded into the sensor from the sensor configuration memory, and for the sensor thus to be configured, when a new sensor is connected, in particular when the sensor/machine interface is switched on. When a sensor is connected to the interface in accordance with the invention, the sensor type can be communicated, for example, via the sensor input, whereupon the control unit provided in accordance with the invention selects the matching set of configuration data from the sensor configuration memory and makes them available to the sensor via the sensor output.

The interface in accordance with the invention can be provided with a sensor operating mode selection switch via which different operating modes of the sensor can be set. The data to be communicated to the sensor for the setting of the sensor operating mode can in particular be matched to the automatically recognized type of the respectively connected sensor.

It is, for example, possible by the said sensor operating mode selection switch to operate a light grid in a first mode in which the interruption of each light beam of the light grid results in an object detection signal. The light grid can moreover be operated in a second mode in another position of the sensor operating mode selection switch in that the interruption of specific light beams of the light grid does not result in the triggering of an object detection signal (blanking). This second mode is required, for example, when specific regions of the light grid have to be blanked out to permit the supply of material to a machine. Even further modes of the sensor can also be set by means of the sensor operating mode selection switch; for example, with a light grid, a plurality of blanked regions differing from one another can be defined which can then be activated by the sensor operating mode selection switch.

The sensor operating mode selection switch can work such that, in a defined switch position, with different types of sensors, respective functions or operating modes corresponding to one another are activated, although these different sensors require different control signals for this. These different control signals must, in this case, be associated with the said switch position in the interface in accordance with the invention. Which control signals are then transmitted to the sensor, can be decided in that the interface in accordance with the invention automatically recognizes which type of sensor is connected.

The sensor/machine interface in accordance with the invention can be provided with a plurality of sensor inputs, sensor outputs, machine outputs and/or machine inputs in order thus to permit the simultaneous operation of a plurality of sensors and/or machines in connection with a single sensor/machine interface.

Further preferred embodiments of the interface in accordance with the invention and of methods for its operation are recited in the dependent claims.

The invention will be described in the following with reference to an embodiment and to the only drawing. This drawing shows a block diagram of a sensor/machine interface with devices or machines connected thereto.

The sensor/machine interface 1 in accordance with the invention is accommodated in a housing 2. It has a control unit 3 which communicates with a program memory 4.

The control unit 3 is furthermore in a position to receive signals which are made available from a sensor input 5 and from a machine input 6. The control unit 3 can furthermore control a sensor output 7 and a machine output 8.

The sensor/machine interface 1 is connected to a sensor 9, for example to a light grid, via the sensor input 5 and the sensor output 7. The sensor/machine interface 1 is connected to a processing machine 10, for example to a press, in a corresponding manner via the machine input 6 and via the machine output 8.

A program module memory 11 is furthermore present in the housing 2 and a plurality of program modules forming a program library are stored therein. The program module memory 11 communicates like the program memory 4 with the control unit 3.

The sensor/machine interface 1 is furthermore provided with a programming interface 12 to which a laptop 13 can be connected. The laptop 13 can communicate with the control unit 3 via this programming interface 12.

A program selection switch 14 is furthermore attached to the sensor/machine interface 1. It acts on the control unit 3 and different programs stored in the program memory 4 can be activated via it. A sensor operating mode selection switch 15 is moreover provided which likewise acts on the control unit 3, whereby different operating modes can be set at the sensor 9 via the sensor output 7. In an alternative embodiment, the functions of the program selection switch 14 and of the sensor operating mode selection switch 15 can also be combined in one single selection switch.

A configuration interface 16 of the sensor/machine interface 1 is suitable to be connected to an external configuration device 17 via which sensor configuration data can be transmitted from the configuration device 17 via the configuration interface 16 and the control unit 3 to a sensor configuration memory 18.

The putting into operation of an arrangement in accordance with the described block diagram can take place as follows, for example:

A laptop 13 is connected to the programming interface 12. Different program modules are then loaded from the program module memory 11 via the operating interface running on the laptop 13 and are assembled to one or more programs which are matched to the respective application and which are then stored in the program memory 4. The respectively desired program is then activated via the program selection switch 14.

A non-configured sensor 9 is subsequently connected to the sensor input 5 and to the sensor output 7. Furthermore, the configuration device 17 is connected to the configuration interface 16 for the purpose of the configuration of this sensor 9. The configuration data required by the sensor 9 are then loaded from the configuration device 17 via the configuration interface 16 and via the control unit 3 into the sensor configuration memory 18, on the one hand, and via the sensor output 7 into the sensor 9, on the other hand. If the sensor 9 is defective at a later time and is replaced by another sensor, the configuration data stored in the sensor configuration memory 18 can be automatically loaded into the new sensor so that this is configured without the configuration device 17 having to be connected again.

The respectively desired operating mode of the sensor can be set via the sensor operating mode selection switch 15.

The unit of sensor/machine interface 1, sensor 9 and machine 10 can subsequently enter into operation. The respective program running in the control unit 3 can control the machine 10 in the desired manner via the machine output 8 in dependence on sensor state signals which are supplied via the sensor input 5 and on machine state signals which are supplied via the machine input 6.

REFERENCE NUMERAL LIST 1 sensor/machine interface
2 housing
3 control unit
4 program memory
5 sensor input
6 machine input
7 sensor output
8 machine output
9 sensor
10 machine
11 program module memory
12 programming interface
13 laptop
14 program selection switch
15 sensor operating mode selection switch
16 configuration interface
17 configuration device
18 sensor configuration memory

The invention claimed is:

1. A sensor/machine interface for coupling of at least one sensor to at least one machine having at least one sensor input for reception of sensor state signals, at least one machine output for transmission of machine control signals, a program memory and a control unit for outputting program control signals to the machine output in dependence on the signals received via the sensor input, the program memory stores different programs so that program control of the machine output can be carried out in different manners, a program selection switch is provided via which the different programs can be actuated and a sensor operating mode selection switch is provided via which different operating modes of the sensor can be set at the sensor, where the control unit outputs program control signals in accordance with a program selected by the switch and the program selection switch and the sensor operating mode selection switch are combined in one single switch.

2. A sensor/machine interface in accordance with claim 1, characterized in that the sensor/machine interface is accommodated in a housing separate from the sensor and from the machine.

3. A sensor/machine interface in accordance with claim 1, characterized in that at least one machine input is provided for reception of machine state signals, with it being possible to control the machine output in dependence on signals received via the sensor input and/or via the machine input.

4. A sensor/machine interface in accordance with claim 1, characterized in that the machine output is designed for transmission of machine switch-off signals and/or for transmission of machine actuation signals.

5. A sensor/machine interface in accordance with claim 1, characterized in that hardware and software of the sensor/machine interface satisfy safety standards IEC61508 and/or EN 61496.

6. A sensor/machine interface in accordance with claim 1, characterized in that at least the control unit is present in duplicate in a redundant manner.

7. A sensor/machine interface in accordance with claim 1, characterized in that the different programs can be loaded into the program memory by an external programming device via a programming interface.

8. A sensor/machine interface in accordance with claim 1, characterized in that a plurality of program modules forming a program library can be assembled into programs.

9. A sensor/machine interface in accordance with claim 8, characterized in that the plurality of program modules, and thus also the programs assembled from them, satisfy standards IEC61508 and/or EN 61496.

10. A sensor/machine interface in accordance with claim 1, characterized in that a sensor output is provided via which a connected sensor can be configured and/or monitored.

11. A sensor/machine interface in accordance with claim 10, characterized in that a sensor configuration memory is provided in which configuration data for a sensor connected to the sensor output can be stored.

12. A sensor/machine interface in accordance with claim 11, characterized in that different sets of configuration data can be stored in the sensor configuration memory which relate to different sensor types and/or to different programs.

13. A sensor/machine interface in accordance with claim 11, characterized in that configuration data can be loaded from the sensor into the sensor configuration memory.

14. A sensor/machine interface in accordance with claim 11 characterized in that configuration data is sent via the sensor output to the connected sensor in response to a selection of an operating mode via the sensor operating mode selection switch.

15. A sensor/machine interface in accordance with claim 1, characterized in that a plurality of sensor inputs, sensor outputs, machine outputs and/or machine inputs are provided.

16. A method for the operation of a sensor/machine interface for coupling of at least one sensor to at least one machine, the sensor/machine interface having at least one sensor input for reception of sensor state signals, at least one machine output for transmission of machine control signals, a program memory and a control unit for outputting program control signals to the machine output in dependence on the signals received via the sensor input, comprising:

storing different programs in the program memory so that program control of the machine output can be carried out in different manners;

selecting a different program in the program memory by actuating a program selection switch provided on the sensor/machine interface; and selecting a different operating mode of the sensor via a sensor operating mode selection switch provided on the sensor/machine interface, where the program selection switch and the sensor operating mode selection switch are combined in one single switch.

17. A method in accordance with claim 16, characterized in that, on reception of sensor state signals which indicate a presence of an object in the monitored zone, a machine switch-off signal is transmitted via the machine output.

18. A method in accordance with claim 16, characterized in that, on reception of specific sensor state signals or machine state signals or of specific combinations of sensor state signals or machine state signals, no machine switch-off signal is transmitted and, on reception of other sensor state signals or other machine state signals or other combinations of sensor state signals or machine state signals, a machine switch-off signal is transmitted via the machine output.

19. A method in accordance with claim 16, characterized in that a machine clock signal generated in dependence on machine state signals and/or on sensor state signals is transmitted via the machine output to trigger specific machine functions.

20. A method in accordance with claim 16, characterized in that the programs stored in the program memory are assembled from pre-determined program modules via an operating interface in particular running on a computer or on a laptop.

21. A method in accordance with claim 16, characterized in that whether the sensor/machine interface is working correctly, and/or whether the sensor matching the selected program is connected to the sensor input and/or output, and/or whether the machine matching the selected program is connected to the machine input and/or output is automatically monitored by means of the programs stored in the program memory.

22. A method in accordance with claim 16, characterized in that a connected sensor is configured and/or monitored via a sensor output.

23. A method in accordance with claim 16, characterized in that configuration data are loaded from the sensor into the program memory or vice versa.

24. A method in accordance with claim 16, characterized in that configuration data are loaded from a configuration device into the program memory.

25. A method in accordance with claim 16, characterized in that, on connection of a new sensor, configuration data matching the new sensor are automatically loaded from the sensor configuration memory into the sensor and the sensor is thus configured.

26. A method in accordance with claim 16, characterized in that different operating modes of the sensor can be set via a sensor operating mode selection switch.

27. A method in accordance with claim 26, characterized in that the data to be communicated to the sensor for setting of sensor operating mode are matched to the new sensor.

28. A sensor/machine interface for coupling of at least one sensor to at least one machine, comprising:

a sensor input receptive of sensor state signals from the at least one sensor, a sensor output for transmitting sensor control signals to the at least one sensor;

a machine output for transmitting machine control signals to the at least one machine;

a program memory that stores different sets of configuration data for different sensors and different programs so that program control of the machine output can be carried out in different manners;

a switch is provided via which different operating modes of the sensor can be set and one of the different programs is selected; and a control unit that outputs sensor control signals to the sensor output in accordance with an operating mode of the sensor set by the switch and outputs program control signals to the machine output in accordance with the program selected by the switch.

* * * * *

UNITED STATES PATENT AND TRADEMARK OFFICE
CERTIFICATE OF CORRECTION

| | |
|---|---|
| PATENT NO. | : 8,050,778 B2 |
| APPLICATION NO. | : 10/508132 |
| DATED | : November 1, 2011 |
| INVENTOR(S) | : Bernd Manner |

It is certified that error appears in the above-identified patent and that said Letters Patent is hereby corrected as shown below:

In the Title Page:

Item (73) Assignee: "Sick AG, Waldrich (DE)" should be --Sick AG, Waldkirch (DE)--.

Signed and Sealed this
Third Day of January, 2012

David J. Kappos
*Director of the United States Patent and Trademark Office*